United States Patent Office 3,657,343
Patented Apr. 18, 1972

3,657,343
PREPARATION OF YNAMINES AND
PHENYLACETAMIDES
Laurence I. Peterson, Midland, Mich., assignor to The
Dow Chemical Company, Midland, Mich.
No Drawing. Original application Aug. 24, 1969, Ser. No.
662,865. Divided and this application Aug. 27, 1969,
Ser. No. 870,964
Int. Cl. C07c 103/30
U.S. Cl. 260—558 R                                2 Claims

ABSTRACT OF THE DISCLOSURE

A method for preparing ynamines and phenylacetamides comprises contacting phenylacetylenes with primary or secondary amines in the presence of copper and molecular oxygen to produce the ynamine, and then treating the crude mixture with aqueous acid to produce phenylacetamide. When secondary amines are used in the preceding reaction, the ynamines can be isolated and recovered.

---

This application is a division of my U.S. Patent 3,499,928, filed Aug. 24, 1969.

BACKGROUND OF THE INVENTION

My invention is a process for oxidizing phenylacetylenes in the presence of secondary amines, with copper as a catalyst, to yield recoverable ynamines, and further, with an aqueous acid addition, the corresponding phenylacetamides. When a primary amine is reacted with phenylacetylenes, the resultant ynamine is continuously hydrolyzed to the corresponding phenylacetamide without the addition of acid, and the ynamine is not recoverable.

The previously known processes for producing ynamines make use of the reaction of haloacetylenes, or compounds which yield haloacetylene in situ, which lithium amides. These reactions necessitate using difficult to handle and difficultly accessible starting materials. Also required are low temperatures of around −70° C. to control the vigorously exothermic reactions which result.

The hydration of ynamines to phenylacetamides is reported by Wolf and Kowitz (Annalen Der Chemie, 638 33 (1960)). However, this method required the production of ynamines in one step, their isolation, and final conversion, in another step, to the corresponding phenylacetamide.

SUMMARY OF INVENTION

The method of the invention comprises reacting by contacting a phenylacetylene, which may be ring substituted with one or more inert substituents, with a primary or secondary alkyl amine and molecular oxygen, in the presence of a copper catalyst. At the conclusion of this reation, water is added, and, if a secondary amine has been used, the ynamine can be separated. However, an aqueous acid can be added in lieu of water at this point, and the ynamine will be readily hydrated to the corresponding phenylacetamide.

If a primary amine be used in the above, although the ynamine is probably formed, it cannot be recovered, as it is too readily hydrated to the corresponding phenylacetamide. The latter, then, is the only product isolated.

A preferred embodiment of the above is a method for the preparation of ynamines (STRUCTURE I) and phenylacetamides (STRUCTURE II)

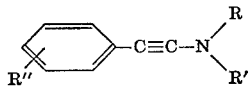

STRUCTURE I

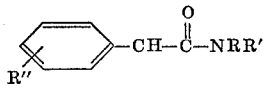

STRUCTURE II wherein each R is an alkyl group, preferably from 1 to 8 carbon atoms, such as methyl, butyl or octyl, or taken together form an alkylene group, R' is hydrogen or R, and R" is hydrogen or an inert substituent.

This method comprises reacting by contacting a phenylacetylene of the formula

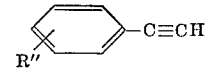

wherein R" is hydrogen or an inert substituent, such as analkyl, preferably from 1 to 8 carbon atoms, such as methyl, butyl or octyl; a phenyl; an alkoxy, preferably from 1 to 8 carbon atoms, such as methoxy, butoxy or octoxy; a phenoxy or an inert halogen, as fluorine or chlorine, with an amine of the formula RR'NH, R and R' as defined above, in an inert solvent, such as benzene or methanol, or in an excess of the amine, and molecular oxygen, in the presence of a copper salt capable of producing $Cu^+$ or $Cu^{++}$ ions to produce Structure I. The molar ratio of the copper catalyst to phenylacetylene is not critical and can vary from about 1.0 to 0.0001, and is preferably from about 0.05 to 0.2. The molar ratio of amine to phenylacetylene suitably should be greater than 1.0, and most preferably about 10.0. The temperature can vary from about −40° to 80° C., and most preferably is from 0° to 40° C. And the reaction time, although not critical, is most desirably from about 5 to 30 minutes. Atmospheric pressure is adequate, although increasing the oxygen pressure above one atmosphere has a slightly favorable effect.

Addition of an aqueous acid to the crude reaction mixture results in hydration of Structure I to Structure II.

This method also comprises reacting a phenylacetylene of the same formula as above with a primary amine in the same reaction environment as described above. This reaction produces an intermediate which when contacted with water is converted to an amine of Structure II, and cannot be separately recovered.

SPECIFIC EMBODIMENTS

Following are specific examples of my invention, although they are in no way intended to limit same:

Example I.—Oxidation of phenylacetylene in the presence of dimethylamine

Phenylacetylene (5.1 g., 0.050 mole) in 100 ml. of benzene was added dropwise over one-half hour to a stirred solution of 2.0 g. (0.010 mole) of cupric acetate monohydrate dissolved in 25 ml. of dimethylamine and 100 ml. of benzene at 0° C. A stream of oxygen was continuously passed through the reaction mixture during addition of the phenylacetylene and for 30 minutes thereafter. Water (50 ml.) was then added to the reaction mixture to precipitate the copper salts. The colorless benzene layer was washed twice with 50 ml. of water and then filtered and dried over calcium sulfate. Dimethylaminophenylacetylene was then isolated by removing the benzene under vacuum and by allowing the coproduced diphenylbutadiyne to crystallize from solution at 0° C. The resulting liquid was shown to be the ynamine by comparing its infrared and N.M.R. spectra with authentic material. The N.M.R. spectrum revealed resonance peaks (CCl₄) at −2.73 p.p.m. and −7.14 p.p.m. in a 6:5 ratio, respectively, whereas the infrared spectrum exhibited a very intense doublet at 2200 and 2230 cm.⁻¹.

Gas chromatographic analysis of the crude product revealed that the phenylacetylene was quantitatively converted into product and that the crude reaction product consisted of 58% ynamine and 42% 1,4-diphenylbutadiyne.

Example II.—Oxidation of phenylacetylene in the presence of dimethylamine

When the reaction was conducted as described in Example I, except that the reaction mixture is worked up with dilute hydrochloric acid instead of water, the product is N,N-dimethylphenylacetamide since the ynamine is readily hydrated in the presence of aqueous acids.

Example III.—Oxidation of phenylacetylene in the presence of ethylamine

Oxygen was bubbled through a solution of 10.0 g. (0.05 mole) of cupric acetate monohydrate in 300 ml. of anhydrous ethylamine at 0–5° C. To this reaction mixture was added dropwise a solution of 25.5 g. (0.25 mole) of phenylacetylene in 325 ml. of benzene over a two hour period. The reaction mixture was worked up as in Example I, to give a product which contained N-ethylphenylacetamide.

The following table shows the results of various experiments which exemplify my invention. A comparison of the conversion percentage and the ynamine/dimer ratio essentially expresses 100% of the reactants and products. The ratio of the secondary amine to phenylacetylene was 20.0 in all cases. The concentration of the catalyst is expressed in moles per liter, while the ynamine/dimer ratio is expressed as moles of ynamine per mole of 1,4-diphenylbutadiyne.

I claim:
1. A method for the preparation of a phenylacetamide of the formula

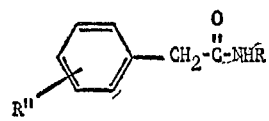

which comprises reacting by contacting with molecular oxygen, at a temperature of from about −40° to 80° C. and in the presence of a catalytic amount of a soluble copper salt that is capable of producing $Cu^+$ or $Cu^{++}$ ions, a phenylacetylene of the formula

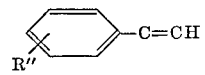

and at least about an equimolar amount of a primary amine having the formula $RNH_2$, in an inert solvent or in an excess of the amine and then treating the resulting intermediate with water to thereby produce the above phenylacetamide, wherein each R is an alkyl group and R'' is hydrogen or an inert substituent.

2. The method of claim 1 wherein R is an alkyl group having from 1 to 8 carbon atoms.

| Experiment number | Amine | Solvent | Catalyst | Conc. of catalyst | Oxygen pressure, mm. | Reaction temp., °C. | Ynamine/dimer | Conversion percent |
|---|---|---|---|---|---|---|---|---|
| 80 | Dimethyl | Benzene | $Cu(OAc)_2$ | .055 | 760 | 0 | .43 | 90 |
| 82 | Diethyl | do | $Cu(OAc)_2$ | .055 | 760 | 20 | .49 | 49 |
| 86 | do | $HNEt_2$ | $Cu(OAc)_2$ | .67 | (1) | 0 | .04 | 99 |
| 87 | do | $HNEt_2$ | $Cu(OAc)_2$ | .011 | 760 | 0 | .75 | 28 |
| 91 | do | $HNEt_2$ | $Cu(OBz)_2$ | .055 | 760 | 20 | .80 | 100 |
| 93 | do | $HNEt_2$ | $Cu(OBz)_2$ | .055 | 2,300 | 20 | .83 | 100 |
| 108 | do | $HNEt_2$ | CuOAc | .055 | 760 | 20 | .64 | 100 |
| 178B | Dimethyl | Toluene | $Cu(OAc)_2$ | .055 | 760 | 5 | .66 | 100 |

1 $NoO_2$.

References Cited

UNITED STATES PATENTS 3,340,246   9/1967   Viehe _____ 260—112.5

HENRY R. JILES, Primary Examiner

H. I. MOATZ, Assistant Examiner

U.S. Cl. X.R.

260—558 HL, 559 R